US 9,442,651 B2

(12) United States Patent
Thorsander et al.

(10) Patent No.: US 9,442,651 B2
(45) Date of Patent: *Sep. 13, 2016

(54) METHOD AND APPARATUS FOR TEXT SELECTION

(71) Applicant: BlackBerry Limited, Waterloo (CA)

(72) Inventors: Simon Martin Thorsander, Eslov (SE); Margaret Elizabeth Kuo, Kitchener (CA); Nils Roger Andersson Reimer, Malmo (SE)

(73) Assignee: BlackBerry Limited, Waterloo, Ontario (CA)

( * ) Notice: Subject to any disclaimer, the term of this patent is extended or adjusted under 35 U.S.C. 154(b) by 381 days.

This patent is subject to a terminal disclaimer.

(21) Appl. No.: 13/968,307

(22) Filed: Aug. 15, 2013

(65) Prior Publication Data

US 2014/0062923 A1 Mar. 6, 2014

Related U.S. Application Data

(63) Continuation of application No. 13/564,687, filed on Aug. 1, 2012, now Pat. No. 8,543,934, which is a continuation of application No. 13/459,980, filed on Apr. 30, 2012.

(51) Int. Cl.

| G06F 3/048 | (2013.01) |
|---|---|
| G06F 3/0488 | (2013.01) |
| G06F 3/0484 | (2013.01) |
| G06F 3/0481 | (2013.01) |

(Continued)

(52) U.S. Cl.
CPC ......... *G06F 3/0488* (2013.01); *G06F 3/04817* (2013.01); *G06F 3/0481* (2013.01); *G06F 3/0482* (2013.01); *G06F 3/04842* (2013.01); *G06F 17/24* (2013.01)

(58) Field of Classification Search
CPC ............. G06F 3/0481; G06F 3/04842; G06F 3/0488; G06F 3/0482; G06F 3/04817; G06F 17/24
See application file for complete search history.

(56) References Cited

U.S. PATENT DOCUMENTS

| 3,872,433 A | 3/1975 | Holmes et al. |
|---|---|---|
| 4,408,302 A | 10/1983 | Fessel et al. |

(Continued)

FOREIGN PATENT DOCUMENTS

| CA | 2688204 A1 | 7/2010 |
|---|---|---|
| CN | 101021762 A | 8/2007 |

(Continued)

OTHER PUBLICATIONS

Canadian Office Action in Canadian Application No. 2,821,784, dated Jul. 9, 2014, 3 pages.

(Continued)

*Primary Examiner* — Tuyetlien T Tran
(74) *Attorney, Agent, or Firm* — Fish & Richardson P.C.

(57) ABSTRACT

A method includes, displaying a content selection icon on a touch-sensitive display of an electronic device, detecting touch input at a touch location on the display operable to select a content selection function associated with the content selection icon, and, modifying the displayed content selection icon to display a touch portion at a location on the display corresponding to said detected touch location and a content selection portion operatively coupled to, but spatially separated from, the touch portion.

18 Claims, 11 Drawing Sheets

(51) Int. Cl.
  *G06F 3/0482* (2013.01)
  *G06F 17/24* (2006.01)

(56) References Cited

U.S. PATENT DOCUMENTS

| | | | |
|---|---|---|---|
| 5,119,079 A * | 6/1992 | Hube | G03G 15/5016 345/173 |
| 5,261,009 A | 11/1993 | Bokser | |
| 5,523,775 A | 6/1996 | Capps | |
| 5,664,127 A | 9/1997 | Anderson et al. | |
| 5,832,528 A | 11/1998 | Kwatinetz et al. | |
| 5,953,735 A | 9/1999 | Forcier | |
| 5,963,671 A | 10/1999 | Comerford et al. | |
| 6,002,390 A | 12/1999 | Masui | |
| 6,064,340 A | 5/2000 | Croft et al. | |
| 6,094,197 A | 7/2000 | Buxton et al. | |
| 6,223,059 B1 | 4/2001 | Haestrup | |
| 6,226,299 B1 | 5/2001 | Henson | |
| 6,351,634 B1 | 2/2002 | Shin | |
| 6,421,453 B1 | 7/2002 | Kanevsky et al. | |
| 6,519,584 B1 | 2/2003 | Tognazzini et al. | |
| 6,646,572 B1 | 11/2003 | Brand | |
| 7,098,896 B2 | 8/2006 | Kushler et al. | |
| 7,107,204 B1 | 9/2006 | Liu et al. | |
| 7,216,588 B2 | 5/2007 | Suess | |
| 7,277,088 B2 | 10/2007 | Robinson et al. | |
| 7,292,226 B2 | 11/2007 | Matsuura et al. | |
| 7,382,358 B2 | 6/2008 | Kushler et al. | |
| 7,394,346 B2 | 7/2008 | Bodin | |
| 7,443,316 B2 | 10/2008 | Lim | |
| 7,479,949 B2 | 1/2009 | Jobs et al. | |
| 7,487,461 B2 | 2/2009 | Zhai et al. | |
| 7,530,031 B2 | 5/2009 | Iwamura et al. | |
| 7,661,068 B2 | 2/2010 | Lund | |
| 7,698,127 B2 | 4/2010 | Trower, II et al. | |
| 7,886,233 B2 | 2/2011 | Rainisto et al. | |
| 7,934,156 B2 | 4/2011 | Forstall et al. | |
| 8,023,930 B2 | 9/2011 | Won | |
| 8,065,624 B2 | 11/2011 | Morin et al. | |
| 8,201,087 B2 | 6/2012 | Kay et al. | |
| 8,276,099 B2 | 9/2012 | Yost | |
| 8,294,680 B2 | 10/2012 | Karlsson | |
| 8,326,358 B2 | 12/2012 | Runstedler et al. | |
| 8,490,008 B2 | 7/2013 | Griffin et al. | |
| 8,661,339 B2 | 2/2014 | Weeldreyer et al. | |
| 8,677,232 B2 | 3/2014 | Weeldreyer et al. | |
| 8,704,783 B2 | 4/2014 | Davis et al. | |
| 8,719,695 B2 | 5/2014 | Weeldreyer et al. | |
| 2002/0010707 A1 | 1/2002 | Chang | |
| 2002/0080186 A1 | 6/2002 | Frederiksen | |
| 2002/0097270 A1 | 7/2002 | Keely et al. | |
| 2002/0122029 A1 | 9/2002 | Murphy | |
| 2002/0154037 A1 | 10/2002 | Houston | |
| 2002/0180797 A1 | 12/2002 | Bachmann | |
| 2004/0111475 A1 | 6/2004 | Schultz | |
| 2004/0135818 A1 | 7/2004 | Thomson et al. | |
| 2004/0140956 A1 | 7/2004 | Kushler et al. | |
| 2004/0153963 A1 | 8/2004 | Simpson et al. | |
| 2004/0201576 A1 | 10/2004 | Shimada et al. | |
| 2005/0017954 A1 | 1/2005 | Kay et al. | |
| 2005/0024341 A1 | 2/2005 | Gillespie et al. | |
| 2005/0039137 A1 | 2/2005 | Bellwood et al. | |
| 2005/0052425 A1 | 3/2005 | Zadesky et al. | |
| 2005/0093826 A1 | 5/2005 | Huh | |
| 2005/0162407 A1 | 7/2005 | Sakurai et al. | |
| 2005/0195173 A1 | 9/2005 | McKay | |
| 2005/0262442 A1 | 11/2005 | Soin et al. | |
| 2006/0022947 A1 | 2/2006 | Griffin et al. | |
| 2006/0026521 A1 | 2/2006 | Hotelling et al. | |
| 2006/0033724 A1 | 2/2006 | Chaudhri et al. | |
| 2006/0053387 A1 | 3/2006 | Ording | |
| 2006/0176283 A1 | 8/2006 | Suraqui | |
| 2006/0209040 A1 | 9/2006 | Garside et al. | |
| 2006/0239562 A1 | 10/2006 | Bhattacharyay et al. | |
| 2006/0253793 A1 | 11/2006 | Zhai et al. | |
| 2006/0265648 A1 | 11/2006 | Rainisto et al. | |
| 2006/0265668 A1 | 11/2006 | Rainisto | |
| 2006/0279548 A1 | 12/2006 | Geaghan | |
| 2007/0040813 A1 | 2/2007 | Kushler et al. | |
| 2007/0046641 A1 | 3/2007 | Lim | |
| 2007/0061753 A1 | 3/2007 | Ng et al. | |
| 2007/0150842 A1 | 6/2007 | Chaudhri et al. | |
| 2007/0156394 A1 | 7/2007 | Banerjee et al. | |
| 2007/0157085 A1 | 7/2007 | Peters | |
| 2007/0256029 A1 | 11/2007 | Maxwell | |
| 2007/0263932 A1 | 11/2007 | Bernardin et al. | |
| 2008/0033713 A1 | 2/2008 | Brostrom | |
| 2008/0100581 A1 | 5/2008 | Fux | |
| 2008/0122796 A1 | 5/2008 | Jobs et al. | |
| 2008/0126387 A1 | 5/2008 | Blinnikka | |
| 2008/0136587 A1 | 6/2008 | Orr | |
| 2008/0141125 A1 | 6/2008 | Ghassabian | |
| 2008/0158020 A1 | 7/2008 | Griffin | |
| 2008/0184360 A1 | 7/2008 | Kornilovsky et al. | |
| 2008/0189605 A1 | 8/2008 | Kay et al. | |
| 2008/0231610 A1 | 9/2008 | Hotelling et al. | |
| 2008/0259040 A1 | 10/2008 | Ording et al. | |
| 2008/0273013 A1 | 11/2008 | Levine et al. | |
| 2008/0281583 A1 | 11/2008 | Slothouber et al. | |
| 2008/0304890 A1 | 12/2008 | Shin et al. | |
| 2008/0309644 A1 | 12/2008 | Arimoto | |
| 2008/0316183 A1 | 12/2008 | Westerman et al. | |
| 2008/0318635 A1 | 12/2008 | Yoon et al. | |
| 2009/0002326 A1 | 1/2009 | Pihlaja | |
| 2009/0006991 A1 | 1/2009 | Lindberg et al. | |
| 2009/0025089 A1 | 1/2009 | Martin et al. | |
| 2009/0058823 A1 | 3/2009 | Kocienda | |
| 2009/0058830 A1 | 3/2009 | Herz et al. | |
| 2009/0066668 A1 | 3/2009 | Kim et al. | |
| 2009/0077464 A1 | 3/2009 | Goldsmith et al. | |
| 2009/0085881 A1 | 4/2009 | Keam | |
| 2009/0094562 A1 | 4/2009 | Jeong et al. | |
| 2009/0125848 A1 | 5/2009 | Keohane et al. | |
| 2009/0132576 A1 | 5/2009 | Miller et al. | |
| 2009/0144667 A1 | 6/2009 | Christoffersson et al. | |
| 2009/0160800 A1 | 6/2009 | Liu et al. | |
| 2009/0167700 A1 | 7/2009 | Westerman et al. | |
| 2009/0174667 A1 | 7/2009 | Kocienda et al. | |
| 2009/0193334 A1 | 7/2009 | Assadollahi | |
| 2009/0213081 A1 | 8/2009 | Case, Jr. | |
| 2009/0228792 A1 | 9/2009 | Van Os et al. | |
| 2009/0228842 A1 | 9/2009 | Westerman et al. | |
| 2009/0237361 A1 | 9/2009 | Mosby et al. | |
| 2009/0247112 A1 | 10/2009 | Lundy et al. | |
| 2009/0251410 A1 | 10/2009 | Mori et al. | |
| 2009/0254818 A1 | 10/2009 | Jania et al. | |
| 2009/0259962 A1 | 10/2009 | Beale | |
| 2009/0265669 A1 | 10/2009 | Kida et al. | |
| 2009/0284471 A1 | 11/2009 | Longe et al. | |
| 2009/0295737 A1 | 12/2009 | Goldsmith et al. | |
| 2009/0307768 A1 | 12/2009 | Zhang et al. | |
| 2009/0313693 A1 | 12/2009 | Rogers | |
| 2010/0020033 A1 | 1/2010 | Nwosu | |
| 2010/0020036 A1 | 1/2010 | Hui et al. | |
| 2010/0045705 A1 | 2/2010 | Vertegaal et al. | |
| 2010/0052880 A1 | 3/2010 | Laitinen | |
| 2010/0070908 A1 | 3/2010 | Mori et al. | |
| 2010/0079413 A1 | 4/2010 | Kawashima et al. | |
| 2010/0095238 A1 | 4/2010 | Baudet | |
| 2010/0115402 A1 | 5/2010 | Knaven et al. | |
| 2010/0127991 A1 | 5/2010 | Yee | |
| 2010/0131900 A1 | 5/2010 | Spetalnick | |
| 2010/0141590 A1 | 6/2010 | Markiewicz et al. | |
| 2010/0156813 A1 | 6/2010 | Duarte et al. | |
| 2010/0156818 A1 | 6/2010 | Burrough et al. | |
| 2010/0161538 A1 | 6/2010 | Kennedy, Jr. et al. | |
| 2010/0171713 A1 | 7/2010 | Kwok et al. | |
| 2010/0197352 A1 | 8/2010 | Runstedler et al. | |
| 2010/0199176 A1 | 8/2010 | Chronqvist | |
| 2010/0199224 A1 | 8/2010 | Doerring | |
| 2010/0225599 A1 | 9/2010 | Danielsson et al. | |
| 2010/0235726 A1 | 9/2010 | Ording et al. | |
| 2010/0235729 A1 | 9/2010 | Kocienda et al. | |
| 2010/0253620 A1 | 10/2010 | Singhal | |

(56) References Cited

U.S. PATENT DOCUMENTS

| | | |
|---|---|---|
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0277424 A1 | 11/2010 | Chang et al. |
| 2010/0287486 A1 | 11/2010 | Coddington |
| 2010/0289757 A1 | 11/2010 | Budelli |
| 2010/0292984 A1 | 11/2010 | Huang et al. |
| 2010/0293460 A1 | 11/2010 | Budelli |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0015919 A1 | 1/2011 | Rosart et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0060984 A1 | 3/2011 | Lee |
| 2011/0061029 A1 | 3/2011 | Yeh et al. |
| 2011/0063231 A1 | 3/2011 | Jakobs et al. |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1 | 4/2011 | Gargi et al. |
| 2011/0119623 A1 | 5/2011 | Kim |
| 2011/0145138 A1 | 6/2011 | Bradley |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0202835 A1 | 8/2011 | Jakobsson et al. |
| 2011/0202876 A1 | 8/2011 | Badger et al. |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0285656 A1 | 11/2011 | Yaksick et al. |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1* | 2/2012 | Victor ............... G06F 3/0482 715/702 |
| 2012/0030623 A1 | 2/2012 | Hoellwarth |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0092278 A1 | 4/2012 | Yamano |
| 2012/0102401 A1 | 4/2012 | Ijas et al. |
| 2012/0110518 A1 | 5/2012 | Chan et al. |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0166696 A1 | 6/2012 | Kallio et al. |
| 2012/0167009 A1 | 6/2012 | Davidson et al. |
| 2012/0185787 A1 | 7/2012 | Lisse et al. |
| 2012/0223959 A1 | 9/2012 | Lengeling |
| 2012/0227009 A1 | 9/2012 | Fiedler |
| 2012/0249595 A1 | 10/2012 | Feinstein |
| 2012/0268388 A1 | 10/2012 | Razzaghi |
| 2012/0306772 A1 | 12/2012 | Tan et al. |
| 2012/0306778 A1 | 12/2012 | Weeldreyer et al. |
| 2012/0306779 A1 | 12/2012 | Weeldreyer et al. |
| 2012/0311422 A1 | 12/2012 | Weeldreyer et al. |
| 2012/0311435 A1 | 12/2012 | Weeldreyer et al. |
| 2012/0311437 A1 | 12/2012 | Weeldreyer et al. |
| 2013/0007606 A1 | 1/2013 | Dolenc |
| 2013/0061317 A1 | 3/2013 | Runstedler et al. |
| 2013/0067373 A1 | 3/2013 | Weir et al. |
| 2013/0067411 A1 | 3/2013 | Kataoka et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125036 A1 | 5/2013 | Griffin et al. |
| 2013/0125037 A1 | 5/2013 | Pasquero et al. |
| 2013/0147718 A1 | 6/2013 | Dent et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222255 A1 | 8/2013 | Pasquero et al. |
| 2013/0222256 A1 | 8/2013 | Pasquero et al. |
| 2014/0192004 A1* | 7/2014 | Andersson ............ G06F 3/0237 345/173 |
| 2015/0067559 A1 | 3/2015 | Missig |

FOREIGN PATENT DOCUMENTS

| | | |
|---|---|---|
| EP | 0844571 A2 | 5/1998 |
| EP | 0880090 A2 | 11/1998 |
| EP | 0880090 A3 | 11/1998 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2381384 A1 | 10/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| JP | 2011-197782 A | 10/2011 |
| JP | 2012-068963 A | 4/2012 |
| KP | 20120030652 A | 3/2012 |
| WO | WO03/029950 A2 | 4/2003 |
| WO | WO03/054681 A1 | 7/2003 |
| WO | WO2004/001560 A1 | 12/2003 |
| WO | WO2005/064587 A2 | 7/2005 |
| WO | WO2006/100509 A2 | 9/2006 |
| WO | WO2007/068505 A1 | 6/2007 |
| WO | WO2007/076210 A1 | 7/2007 |
| WO | WO2007/134433 A1 | 11/2007 |
| WO | WO2008/030974 A1 | 3/2008 |
| WO | WO2008/057785 A2 | 5/2008 |
| WO | WO2008/085741 A2 | 7/2008 |
| WO | WO2009/019546 A2 | 2/2009 |
| WO | WO2010/035574 A1 | 4/2010 |
| WO | WO2010/099835 A1 | 9/2010 |
| WO | WO2010/112841 A1 | 10/2010 |
| WO | WO2011/073992 A2 | 6/2011 |
| WO | WO2011/098925 A1 | 8/2011 |
| WO | WO2011/113057 A1 | 9/2011 |
| WO | WO2012/043932 A1 | 4/2012 |

OTHER PUBLICATIONS

International Preliminary Report of Patenability in International Application No. PCT/CA2012/050274, dated Nov. 4, 2014, 6 pages.

(56) References Cited

OTHER PUBLICATIONS

International Preliminary Report of Patenability in International Application No. PCT/CA2012/050362, dated Aug. 26, 2014, 6 pages.
International Preliminary Report of Patenability in International Application No. PCT/CA2012/050405, dated Aug. 26, 2014, 8 pages.
International Preliminary Report of Patenability in International Application No. PCTEP2012/057946, dated Nov. 4, 2014, 5 pages.
International Search Report and Written Opinion in International Application NO. PCTEP2012/057946, dated Aug. 31, 2012, 9 pages.
United States Office Action in U.S. Appl. No. 13/459,301, dated May 2, 2014, 19 pages.
United States Office Action in U.S. Appl. No. 13/459,301, dated Oct. 17, 2014, 18 pages.
United States Office Action in U.S. Appl. No. 13/482,705, dated May 15, 2014 12 pages.
United States Office Action in U.S. Appl. No. 13/482,705, dated Sep. 29, 2014 14 pages.
United States Office Action in U.S. Appl. No. 13/524,678, dated Apr. 18, 2014, 12 pages.
United States Office Action in U.S. Appl. No. 13/524,678, dated Sep. 18, 2014, 10 pages.
United States Office Action in U.S. Appl. No. 13/563,182, dated Jun. 11, 2014, 8 pages.
United States Office Action in U.S. Appl. No. 13/564,697, dated Dec. 6, 2013, 11 pages.
United States Office Action in U.S. Appl. No. 13/564,697, dated Mar. 26, 2014, 9 pages.
United States Office Action in U.S. Appl. No. 13/564,697, dated Sep. 25, 2014, 6 pages.
United States Office Action in U.S. Appl. No. 13/572,232, dated Dec. 13, 2013, 23 pages.
United States Office Action in U.S. Appl. No. 13/572,232, dated Apr. 11, 2014, 38 pages.
United States Office Action in U.S. Appl. No. 13/572,232, dated Oct. 14, 2014, 32 pages.
"Features Included in the T-Mobile G1", http://www.t-mobileg1.com/T-Mobile-G1-Features.pdf, 2009.
"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).
BlackBerry Seeker—Freeware—Pattern Lock v1.0.7, http://www.blackberryseeker.com/applications/preview/Pattern-Lock-v107.aspx, Jul. 28, 2009.
Canadian Office Action dated Aug. 8, 2012, issued in Canadian Application No. 2,688,204 (3 pages).
Canadian Office Action dated Mar. 27, 2013, issued in Canadian Application No. 2,737,314 (3 pages).
Chong et al., Exploring the Use of Discrete Gestures for Authentication, IFIP International Federation for Information Processing, 2009.
Conveniently select text, images, annotations, etc. in a PDF or any other text format on a touch based mobile/tablet device, IP.com Journal, Mar. 1, 2011, XP013142665, (10 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
Droid X by Motorola © 2010 Screen shots.
Droid X by Motorola © 2010 User Manual (72 pages).
Enable or Disable SureType with a RIM BlackBerry Pearl Using Handheld Software, version 4.x, "http://www.wireless.att.com/support_static_files/KB/KB72601.html", at least as early as Feb. 8, 2008 (3 pages).
European Examination Report dated Apr. 5, 2013, issued in European Application No. 12180190.6 (7 pages).
European Examination Report dated Aug. 22, 2013, issued in European Application No. 12166520.2, (4 pages).
European Examination Report dated Aug. 22, 2013, issued in European Application No. 12173818.1, (6 pages).
European Partial Search Report dated Jan. 16, 2013, issued in European Application No. 12182612.7 (5 pages).
European Partial Search Report dated Mar. 7, 2013, issued in European Application No. 12184574.7 (5 pages).
European Partial Search Report dated Sep. 16, 2010, issued in European Application No. 10160590.5 (5 pages).
Extended European Search Report dated Aug. 24, 2012, issued in European Application No. 12166115.1 (5 pages).
Extended European Search Report dated Aug. 24, 2012, issued in European Application No. 12172458.7 (6 pages).
Extended European Search Report dated Aug. 27, 2012, issued in European Application No. 12169649.6 (7 pages).
Extended European Search Report dated Aug. 31, 2012, issued in European Application No. 12166170.6 (7 pages).
Extended European Search Report dated Dec. 21, 2012, issued in European Application No. 12173818.1, (8 pages).
Extended European Search Report dated Feb. 28, 2011, issued in European Application No. 10160590.5 (10 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Jun. 26, 2013, issued in European Application No. 12184574.7 (10 pages).
Extended European Search Report dated Mar. 8, 2013, issued in European Application No. 12182611.9 (8 pages).
Extended European Search Report dated May 6, 2009, issued in European Application No. 09151723.5 (7 pages).
Extended European Search Report dated Nov. 22, 2012, issued in European Application No. 12172892.7 (7 pages).
Extended European Search Report dated Nov. 28, 2011, issued in European Application No. 11180985.1 (4 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
Extended European Search Report dated Sep. 3, 2012, issued in European Application No. 12164300.1 (7 pages).
Final Office Action dated Apr. 25, 2013, issued in U.S. Appl. No. 13/564,697 (11 pages).
Final Office Action dated Apr. 4, 2013, issued in U.S. Appl. No. 13/447,835 (20 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Final Office Action dated Jul. 25, 2013, issued in U.S. Appl. No. 13/560,796, (19 pages).
Final Office Action dated Jul. 30, 2013, issued in U.S. Appl. No. 13/459,301 (27 pages).
Final Office Action dated Jul. 9, 2013, issued in U.S. Appl. No. 13/564,070 (26 pages).
Final Office Action dated Mar. 15, 2013, issued in U.S. Appl. No. 13/572,232 (36 pages).
Final Office Action dated May 10, 2013, issued in U.S. Appl. No. 13/459,301 (16 pages).

(56) References Cited

OTHER PUBLICATIONS

Final Office Action dated May 15, 2013, issued in U.S. Appl. No. 13/563,182 (21 pages).
Final Office Action dated May 2, 2013, issued in U.S. Appl. No. 13/564,687 (17 pages).
Final Office Action dated May 29, 2012, issued in U.S. Appl. No. 12/362,536 (16 pages).
Final Office Action dated Oct. 26, 2011, issued in U.S. Appl. No. 12/362,536 (21 pages).
Google Mobile Help—Editing text, http://supportgoogle.com/mobile/bin/answer.py?hl=en&answer=168926, date of access: Jun. 6, 2012 (2 pages).
GSMArena—Samsung announce s5600 & s5230 full touch midrange phones, http://www.gsmarena.com/samsung_announce_s5600_and_s5230_full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
iPhone User Guide—For iPhone OS 3.1 Software, 2009 (217 pages).
Madhvanath, Sriganesh, HP-Gesture based computing interfaces, Mar. 2008.
Manual del usuario Samsung Moment™ with Google™, dated May 20, 2012 (224 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).
Mobile Tech News—Samsung launches new Gesture Lock touchscreen handsets, http://www.mobiletechnews.com/info/2009/03/11/124559.html, Mar. 11, 2009.
Notice of Allowance dated Aug. 12, 2013, issued in U.S. Appl. No. 13/564,687, (10 pages).
Notice of Allowance dated Mar. 15, 2013, issued in U.S. Appl. No. 13/373,356 (25 pages).
Office Action dated Aug. 7, 2012, issued in U.S. Appl. No. 13/482,705 (10 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Jul. 20, 2012, issued in U.S. Appl. No. 12/764,298 (38 pages).
Office Action dated Jun. 8, 2011, issued in U.S. Appl. No. 12/362,536 (19 pages).
Office Action dated Mar. 12, 2013, issued in U.S. Appl. No. 13/560,796 (22 pages).
Office Action dated May 30, 2013, issued in U.S. Appl. No. 13/572,232 (49 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 15, 2012, issued in U.S. Appl. No. 13/560,270 (15 pages).
Office Action dated Oct. 17, 2012, issued in U.S. Appl. No. 13/563,943 (17 pages).
Office Action dated Oct. 18, 2012, issued in U.S. Appl. No. 13/563,182 (12 pages).
Office Action dated Oct. 23, 2012, issued in U.S. Appl. No. 12/764,298 (41 pages).
Office Action dated Oct. 25, 2012, issued in U.S. Appl. No. 13/459,732 (15 pages).
Office Action dated Oct. 26, 2012, issued in U.S. Appl. No. 13/554,436 (22 pages).
Office Action dated Oct. 5, 2012, issued in U.S. Appl. No. 13/447,835 (20 pages).
Office Action dated Sep. 10, 2012, issued in U.S. Appl. No. 13/524,678 (12 pages).
Office Action dated Sep. 28, 2012, issued in U.S. Appl. No. 13/494,794 (14 pages).
PCT International Search Report and Written Opinion dated Jan. 24, 2013, issued in International Application No. PCT/CA2012/050274 (9 pages).
PCT International Search Report and Written Opinion dated Jun. 14, 2012, issued in International Application No. PCT/IB2011/003273 (8 pages).
PCT International Search Report and Written Opinion dated Nov. 7, 2012, issued in International Application No. PCT/CA2012/050362 (9 pages).
PCT International Search Report and Written Opinion dated Nov. 8, 2012, issued in International Application No. PCT/CA2012/050405 (12 pages).
PCT International Search Report and Written Opinion dated Oct. 12, 2012, issued in International Application No. PCT/EP2012/057944 (10 pages).
PCT International Search Report and Written Opinion dated Sep. 10, 2012, issued in International Application No. PCT/EP2012/057945 (11 pages).
Sprint Support Tutorial Set the Screen Lock Pattern—Samsung Moment, http://support.sprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
Swype Product Features, accessed online at http://www.swype.com/about/specifications/ on Feb. 25, 2013 (2 pages).
Through the Magic Window—Magic Window word processor for the Apple II, Artsci Publishing, 1980, http://www.artscipub.com/history/magicwindow, accessed May 21, 2013 (5 pages).
T-Mobile Forum—Help & How to—Hidden Pattern, http://forums.t-mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Appl. No. 13/447,704, filed Apr. 16, 2012, (93 pages).
U.S. Appl. No. 13/459,301, filed Apr. 30, 2012, (87 pages).
U.S. Appl. No. 13/459,716, filed Apr. 30, 2012, (63 pages).
U.S. Appl. No. 13/459,761, filed Apr. 30, 2012, (35 pages).
U.S. Appl. No. 13/459,872, filed Apr. 30, 2012, (35 pages).
U.S. Appl. No. 13/459,980, filed Apr. 30, 2012, (35 pages).
U.S. Appl. No. 13/481,171, filed May 25, 2012, (24 pages).
U.S. Appl. No. 13/525,576, filed Jun. 18, 2012, (87 pages).
U.S. Appl. No. 13/529,182, filed Jun. 21, 2012, (24 pages).
U.S. Appl. No. 13/534,101, filed Jun. 27, 2012, (85 pages).
U.S. Appl. No. 13/601,736, filed Aug. 31, 2012, (44 pages).
U.S. Appl. No. 13/601,864, filed Aug. 31, 2012, (23 pages).
U.S. Appl. No. 13/601,898, filed Aug. 31, 2012, (28 pages).
U.S. Appl. No. 13/616,423, filed Sep. 14, 2012, (30 pages).
U.S. Appl. No. 13/773,812, filed Feb. 22, 2013, (94 pages).

(56) References Cited

OTHER PUBLICATIONS

User Guide Samsung Moment(TM) with Google(TM), dated Dec. 4, 2009 (122 pages).
User Guide Samsung Moment(TM) with Google(TM), dated Mar. 2, 2010 (218 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
Communication Pursuant to Article 94(3) EPC issued in related European Application No. 12166247.2 on Apr. 29, 2016.

* cited by examiner

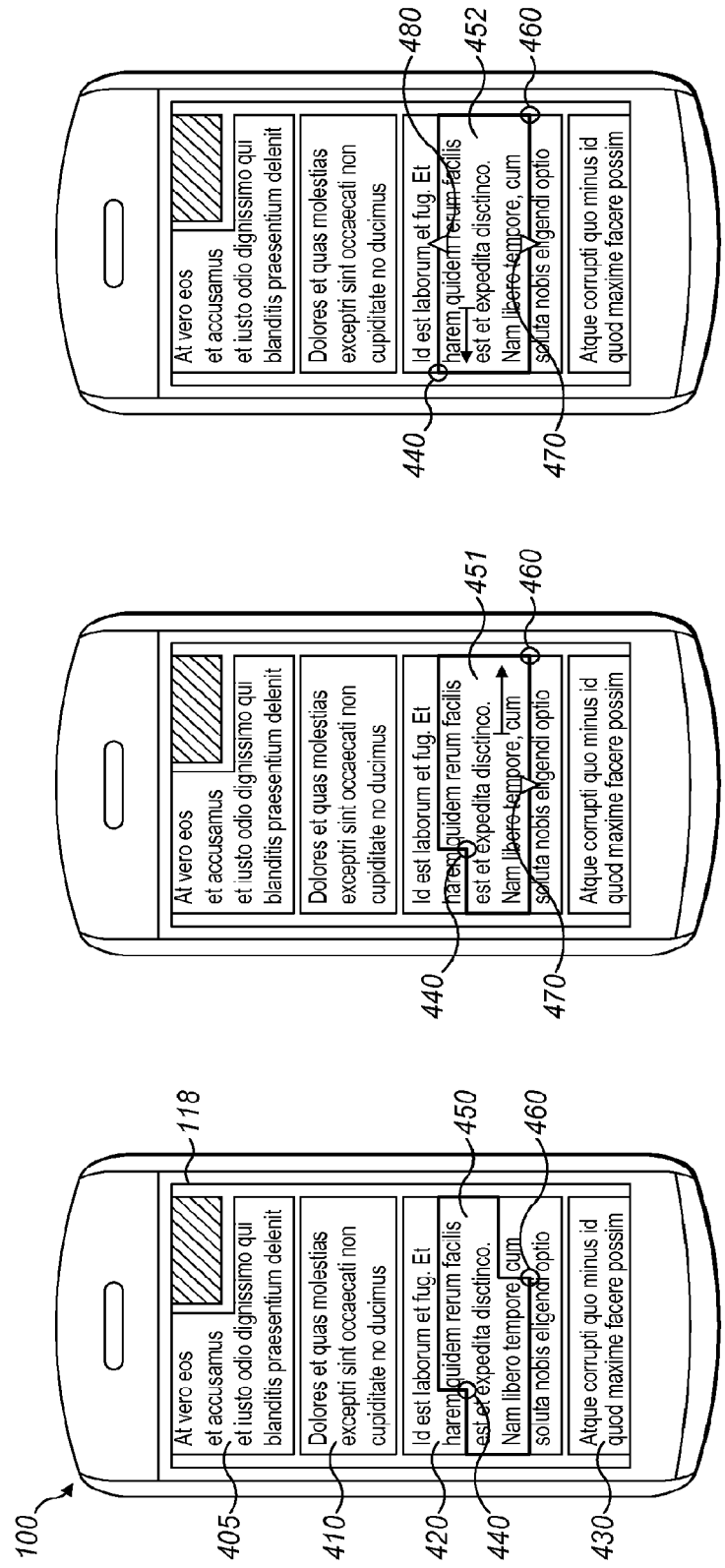

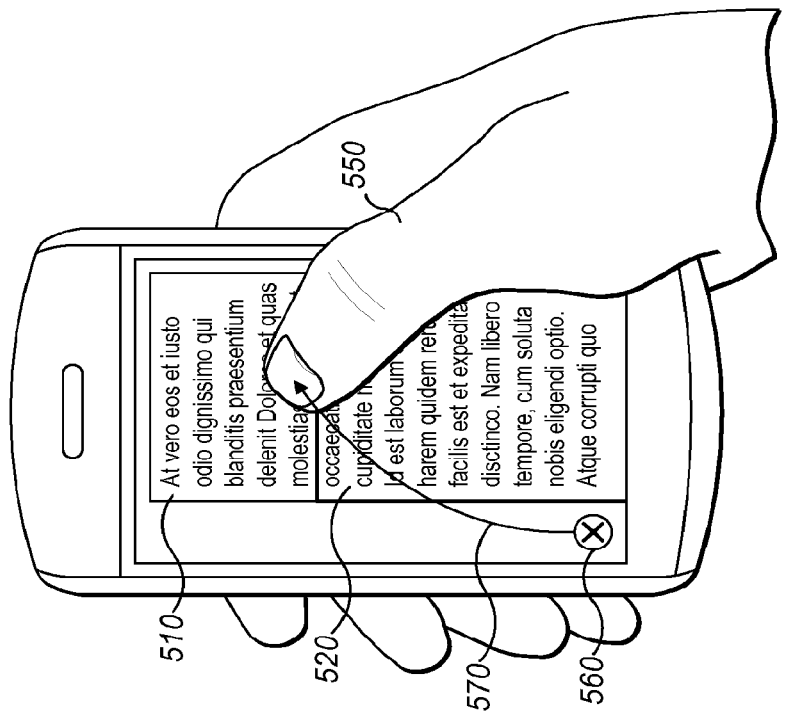
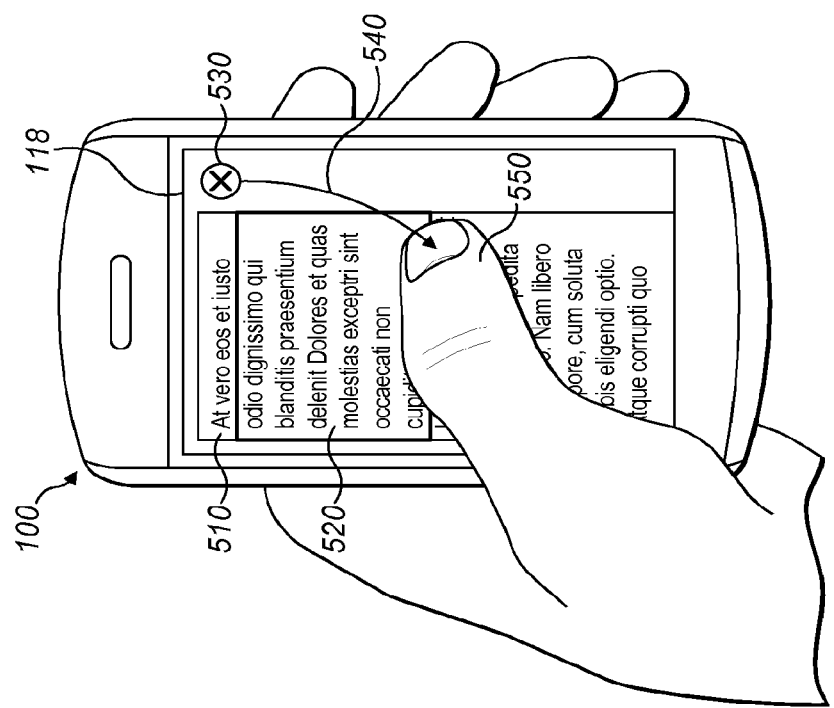

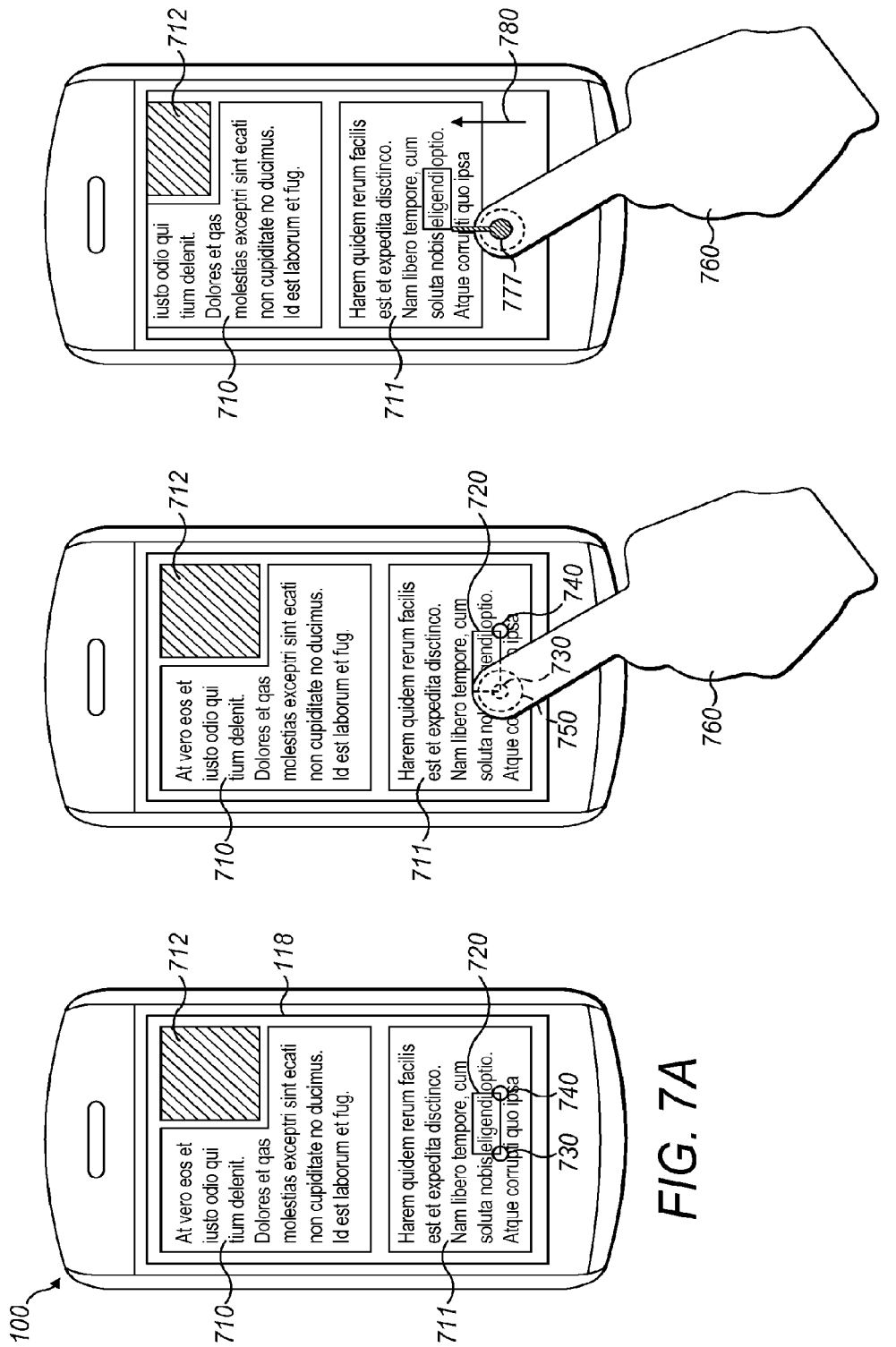

METHOD AND APPARATUS FOR TEXT SELECTION

CROSS REFERENCE TO RELATED APPLICATIONS

This application is a continuation of U.S. patent application Ser. No. 13/564,687, entitled "Method and Apparatus for Text Selection," filed Aug. 1, 2012, which is a continuation of U.S. patent application Ser. No. 13/459,980, filed Apr. 30, 2012, both of which are incorporated herein by reference.

FIELD OF THE TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones (feature phones), smart phones, wireless personal digital assistants (PDAs), tablet computers, and laptop computers with wireless 802.11 or Bluetooth® capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays, such as text, may be modified based on the functions and operations being performed.

Improvements in devices with touch-sensitive displays, including the selection of content on those devices, are desirable.

BRIEF DESCRIPTION OF DRAWINGS

Examples of the present proposed approach will now be described in detail with reference to the accompanying drawings, in which:

FIGS. 4A to 4C illustrate an electronic device in accordance with an embodiment showing the initiation of a paragraph selection mode;

FIGS. 5A and 5B illustrate an electronic device in accordance with an embodiment showing example touch inputs;

FIGS. 7A to 7C illustrate an electronic device in accordance with an embodiment showing the movement of content in response to a touch input;

DETAILED DESCRIPTION

Figure 1:
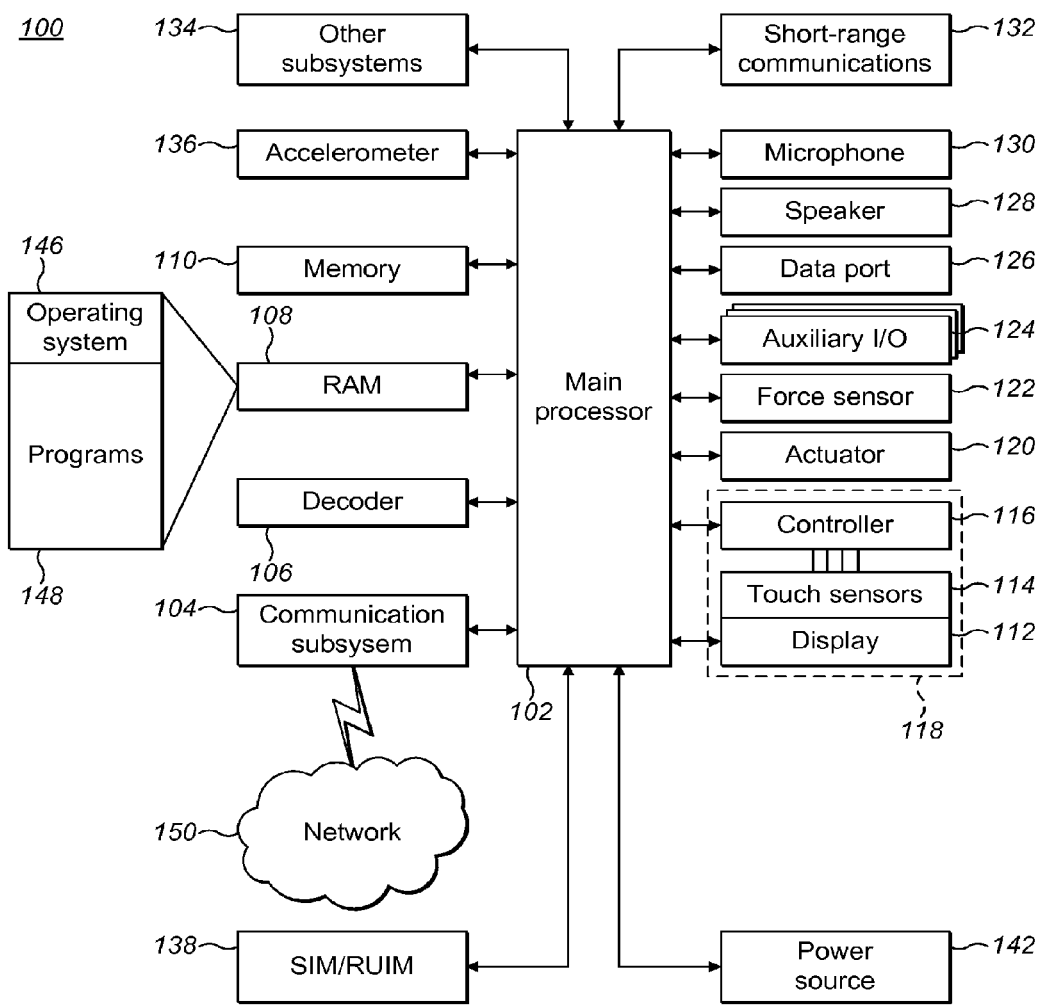
FIG. 1 is a block diagram of a portable electronic device in accordance with the disclosure.

The following describes an apparatus for and method of determining a selection of a selection option based on received user input.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, feature phones, cellular smartphones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

Example Electronic Device

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus (active or passive), pen, or other pointer, based on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Example Smartphone Electronic Device

Figure 2:
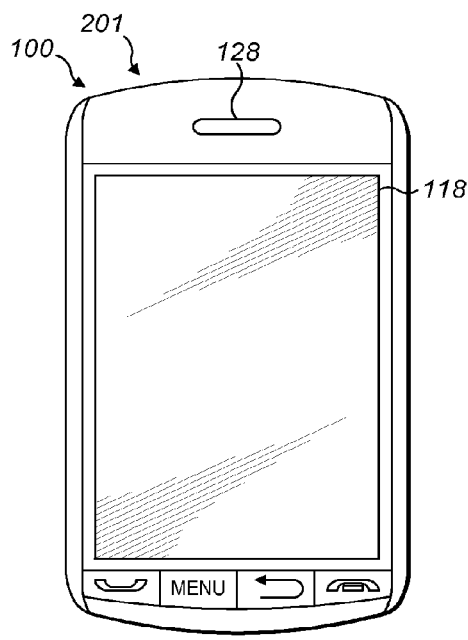
FIG. 2 is a front view of a smartphone in accordance with example embodiments of the present disclosure.

Referring now to FIG. 2, a front view of an example electronic device 100 which is a smartphone 201 is illustrated. The smartphone 201 is a mobile phone which offers more advanced computing capability than a basic non-smartphone cellular phone. For example, the smartphone 201 may have the ability to run third party applications which are stored on the smartphone.

The smartphone 201 may include the components discussed above with reference to FIG. 1 or a subset of those components. The smartphone 201 includes a housing which houses at least some of the components discussed above with reference to FIG. 1.

The example smartphone 201 also includes other input interfaces such as one or more buttons, keys or navigational input mechanisms. In the example illustrated, at least some of these additional input interfaces are disposed for actuation at a front side of the smartphone.

Example Tablet Electronic Device

Figure 3:
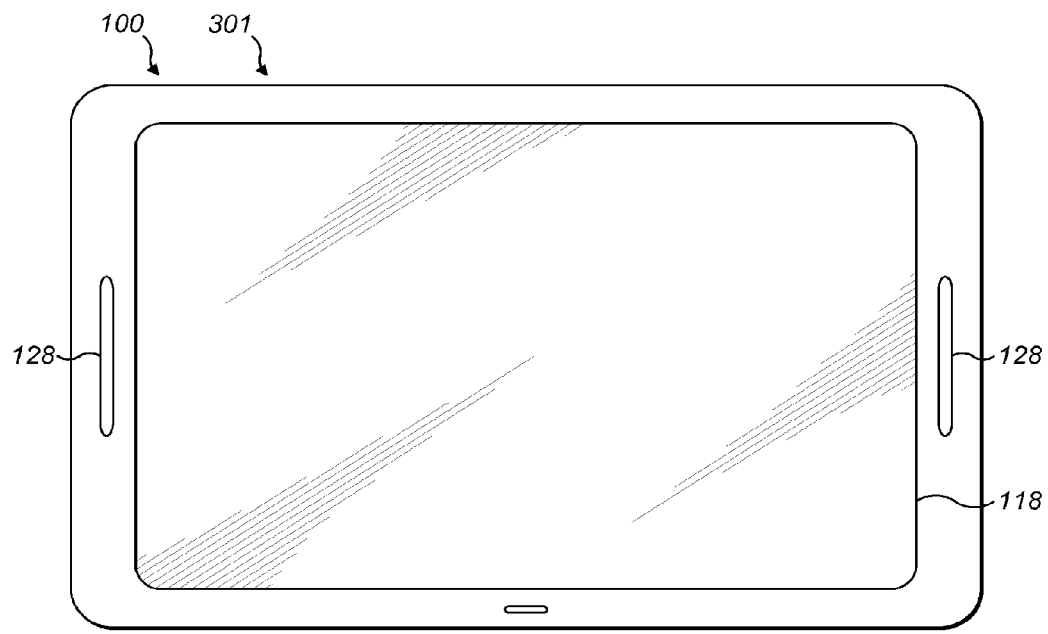
FIG. 3 is a front view of a tablet computer is accordance with example embodiments of the present disclosure.

Referring now to FIG. 3, a front view of an example electronic device 100 which is a tablet computer 301 is illustrated. The tablet computer 301 may include many of the same features and components of the smartphone 201 of FIG. 2. However, the tablet computer 301 of FIG. 3 is generally larger than the smartphone 201. The tablet computer 301 may include the components discussed above with reference to FIG. 1 or a subset of those components. The tablet computer 301 includes a housing which houses at least some of the components discussed above with reference to FIG. 1.

Content Selection

The display 112 of an electronic device 100 is primarily used for displaying content. Through the use of user input means on the electronic device 100, such as touch sensors 114, the user can select content to perform actions on. User interfaces should provide a user with a way of efficiently and intuitively selecting which content they wish to select.

In the following description, text-based content type will be used for illustrating improved methods of selecting content. However, it should be clear that the proposed solutions can be implemented with content types other than text. Text is used to illustrate the methods as it is a good example of a content type that would benefit from such methods, particularly because there are a number of ways it can be grouped. Textual content may be treated as individual letters, or it may be considered as grouping of letters in the form of words, or groupings of words in the form of sentences, or other groupings such as by row, paragraph, column and page.

Given how many different ways there are of grouping text, there may also be different ways a user may wish to select it, as a user may be more interested in selecting a certain paragraph than a certain word. Finer tuned selections (such as selection by letter) allow for greater accuracy of the selection, but would take longer to perform for larger selections (such as selection by paragraph). A user interface may enable a user to perform both fine tuned and larger selections, allowing the user intuitively to switch between the different granularities for text selection.

Paragraph Selection

FIGS. 4A to 4C illustrate a method of switching between granularities of selection. In these examples, the method provides a way of performing letter-by-letter selection as well as paragraph selection.

FIG. 4A shows an electronic device 100 with a touch-sensitive-display 118, the touch-sensitive display 118 displaying four paragraphs of text 405, 410, 420 and 430, a selected portion of text 450 and selection handles at the start 440 and end 460 of the selected text 450. The selected portion of text 450 may have been selected in response to a touch input representing a selection of text.

If the device receives a user input indicating that the end selection handle 460 should be moved (for example a touch and drag of the selection handle 460), the end of the text selection 450 may move with it. A small movement of the end selection handle 460 to the right may cause the end of the text selection 450 to move onto the next letter, snapping to the nearest letter to the moved end selection handle 460. Similarly, small movements of the start selection handle 440 may cause the start of the text selection 450 to snap to the letter nearest to the start selection handle 440. This described modification of the text selection 450 by snapping to whatever letter is closest to a selection handle will be referred to as a letter-by-letter selection.

If a user wished to select large portions of the text, for example the fourth 430 paragraph, they may encounter difficulties with selecting the whole of the fourth paragraph 430 as the end of the paragraph is not displayed on the display 112 due to it being below the visible region of the display 112 in this example. Therefore, to include the fourth paragraph 430 in the selection, the user may have to drag the end selection handle 460 down to the bottom of the display 112, then scroll the screen (either by initiating a scrolling gesture or by allowing the screen to 'creep' up in response to the selection handle's 460 close proximity to the bottom), and, once the end of the fourth paragraph 430 comes into view, continue moving the end selection handle 460 to the end of the fourth paragraph 430. This results in a cumbersome, time consuming user interaction.

The method reduces the burden on the user by providing a paragraph selection mode and determining when to make it available. It may do so by determining whether the selected portion of text 450 has been modified such that either the first or last row of the selection 450 is a complete row of text. If the top or bottom ends of the selected text 450 contains a complete row, then either the end selection handle 460 has been moved to the end of a row, or the start selection handle 440 has been moved to the start of a row, or both events have occurred. In such an instance, as a selection handle has been moved to an outer edge of a row, there may be a possibility that the user intends to start selecting whole paragraphs. Therefore, in response to detecting a selection handle selecting a complete a row, a paragraph selection handle is displayed so that a user can then perform paragraph selection.

FIG. 4B illustrates a paragraph selection handle 470 being displayed in response to a user input. In this example, the selected text 450 of FIG. 4A has been expanded to the selected text 451. This expansion is the result of a movement of the end selection handle 460 to the end of the row, thereby selecting the whole end row of the selected portion of text 451 and thus providing the device 100 with an indication that a paragraph selection mode may be required. The paragraph selection handle 470 may be positioned on the same row as the complete row just selected. In this example, the paragraph selection handle 470 appears on the bottom row, as that is the complete row just selected by movement of the end selection handle 460. The paragraph selection handle 470 may also be positioned this way because the most likely direction of further paragraph selection may be downwards if the end selection handle 460 has been moved to the end of the row.

Similarly, if the start selection handle 440 is moved to completely select a row, as shown in FIG. 4C, then a paragraph selection handle 480 may be displayed on a first row of the newly expanded selected text 452. In FIG. 4C, paragraph selection handles are displayed both on the top 480 and bottom 470 of the selected text 452, as both start 440 and end 460 handles have been moved to completely select a row. If only one of the start 440 or end 460 handles have moved to completely select a row, then the paragraph selection handle may appear only on the completed row and not the other (as shown previously in FIG. 4B).

In addition to, or instead of the criteria that a start or end row of a selected portion of text 450 must be completely selected before paragraph selection handles can be displayed, there may be a requirement that the selected portion of text 450 is above a certain size. For example, there may be a requirement that the selected portion of text 450 spans at least three rows before the paragraph selection handles can be displayed. This may be to avoid the instance where only one or two rows have been selected, leading to the possibility of the paragraph selection handles and start or end selection handles being too close together to individually control by touch input. Having a minimum row requirement may also be beneficial as that way the device may only display the paragraph selection handles once the selected text 450 is larger than a threshold value, thereby indicating a higher likelihood that the user may wish to perform paragraph selections.

The paragraph selection handles themselves may allow the user to select text in a paragraph aware manner. For example, if the paragraph selection handle 470 shown in FIG. 4B were dragged down a small amount, the selected portion of text 451 may expand so as to extend to the end of the current paragraph. This may be displayed by showing the bottom of the selection area move down to the end of the current paragraph, along with the handles 470 and 460. However, this may result in the paragraph selection handle 470 moving away from the original location of the user's touch that was dragging the paragraph selection handle 470. Therefore, if the user wished to continue with paragraph selection, the user would have to reselect the now moved paragraph selection handle. This would be especially problematic if the end of the selected paragraph was not visible on the display.

To address the above problem, the method may instead ensure that the paragraph selection handle 470 being moved is always coupled to the location of the touch input moving it. Thus, as the paragraph selection handle is dragged 470, the underlying content itself moves in the display so that the end of the current paragraph lies under the touch input position. In other words, the display may automatically scroll to the end of the paragraph being selected. In this manner, the user will be able to see how the end point of the selection changes because the display scrolls so as to always show the end point. Similarly, dragging the top paragraph selection handle 480 upwards results in the selection extending to the starts of the paragraphs above, the size of the drag determining how many paragraphs above the current one to extend to. As long as the user drags the paragraph selection handle 470, the device will remain in paragraph selection mode.

If a user drags a bottom paragraph selection handle 470 downwards, the selection area may expand downwards to the end of the paragraph. Further dragging the bottom paragraph selection handle 470 downwards may cause the selection area 452 to expand to the end of a lower paragraph (such as paragraph 430). Similarly, the extent of the drag upwards of a top paragraph selection handle 480 may determine how many paragraphs up the selection area 452 is extended to.

Dragging the selection handles in the opposite direction, however, may result in different behaviour. For example, dragging a bottom selection handle 470 upwards may cause the selection area 452 to return to what it was prior to being modified by the bottom paragraph selection handle 470. Optionally, dragging the bottom selection handle 470 upwards may cause the selection area 452 to contract in discrete amounts such that for each drag upwards, the selection area 452 contracts so that it covers one less full paragraph. Once the selection area 452 only covers one whole or paragraph, a further movement upward of the bottom selection handle 470 upwards may have no effect on the selection area 452.

Figure 10:
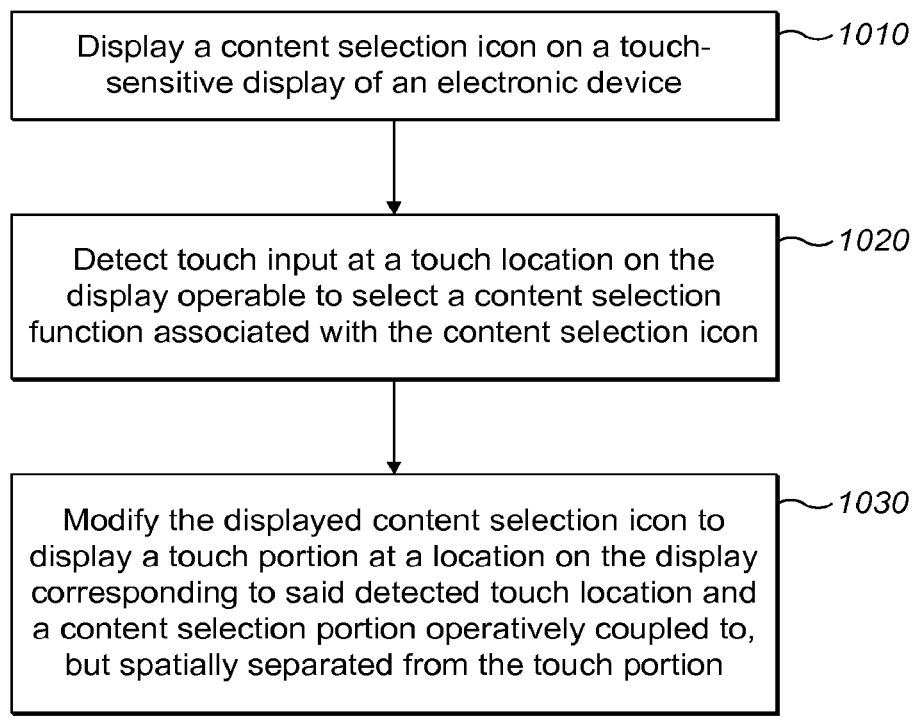
FIG. 10 is a flowchart illustrating a method of modifying a selection icon in accordance with the disclosure.

A flowchart illustrating a method of performing paragraph selection is shown in FIG. 10. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, which may be a non-transitory or tangible storage medium.

In the method shown in FIG. 10, a first touch input representing a selection of multiple rows of text displayed on a touch-sensitive display of an electronic device is detected 1210. A determination is made as to whether a complete row of text has been selected from a start point or to an end point of the selected text 1220. A paragraph selection handle proximal to the row is displayed, the paragraph selection handle being responsive to a second touch input to place the electronic device in a paragraph selection mode for the selection of text 1230.

Row Selection

In the previous section, a method for enabling and performing paragraph selection was disclosed. In addition to, or independently of this method, a method for enabling row-by-row selection is provided below.

In letter-by-letter selection mode, as a selection handle is moved, the corresponding part of the selection area (selected portion of text) snaps to the letter nearest to the selection handle. Therefore, in letter-by-letter mode, as a selection handle is moved across a row, letters are individually added or removed from the selection. However, as a selection handle is moved up or down to a different row, the nearest letter to the selection handle is on a different row and so, when the selection area snaps to that area, it snaps to include all the other letters in the row up to the selection handle. Therefore, moving a selection handle to the very right or left of a row, and subsequently moving the selection handle up or down, results in the entire rows being added or removed from the selection at a time. In this way, it is possible to perform row-by-row selection simply by using the mechanics provided by existing letter-by-letter selection.

However, performing the above type of row-by-row selection has some drawbacks. To perform row-by-row selection in this manner requires that a selection handle moves straight up or down along the side of the text. Moving the selection handle into the text and away from the edge may result in individual letters being selected instead of rows. Therefore, using a letter-by-letter selection mechanism for row-by-row selection may be too sensitive to small deviations in the horizontal movement of the selection handle.

FIGS. 5A and 5B illustrate possible sources of deviations. FIG. 5A shows an electronic device 100 with a touch-sensitive display 118, displaying on the touch-sensitive display some text 510 and a selection of the text 520. When a user attempts to perform row-by-row selection with the thumb 550 of the left hand, they may start the gesture at point 530 and begin to drag a selection handle straight down. this drag movement 540 begins to curve into the text and away from the edge because of the natural curvature of a thumb's movement. This may lead to text selection by letter rather than by row. Similarly, in FIG. 5B, the natural curvature of movement of a user's right thumb may result in a gesture 570 starting at point 560 to deviate from a straight line path and a curve into the text. This curvature may be further exaggerated by performing the gesture quickly.

Figure 6A:
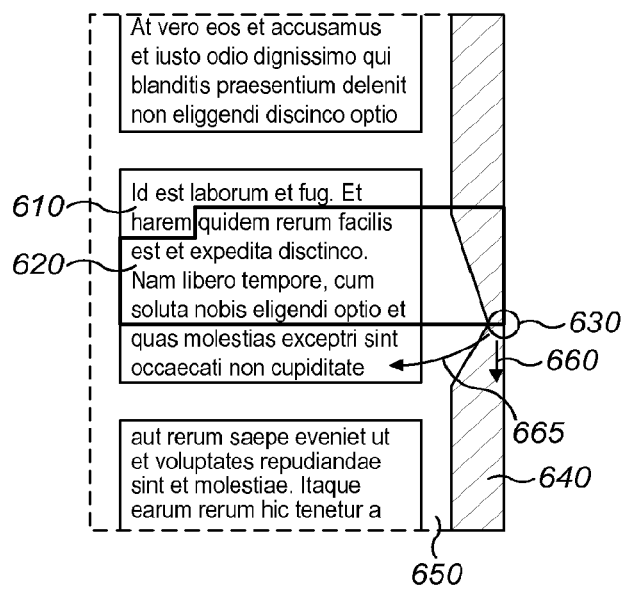
FIGS. 6A to 6C illustrate a method of switching between row and letter selection in accordance with the disclosure.
Figure 6B:
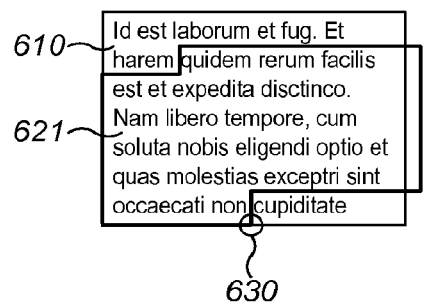
Figure 6C:
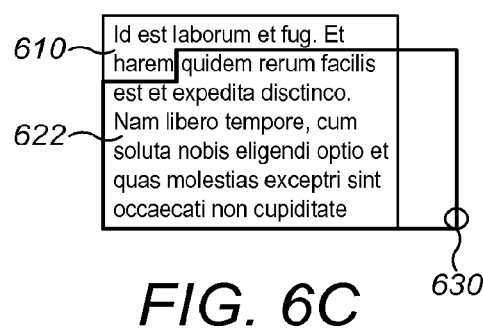

One way to solve the above problem is to incorporate a dedicated row-by-row selection mode, such as is illustrated in FIGS. 6A to 6C. FIG. 6A shows a portion of a display 114 containing text 610, a selection area 620, and a selection handle 630. In this example, the selection handle 630 has been dragged to the side of the text, and in doing so has enabled a row-by-row selection mode. Upon entering this mode, moving the selection handle 630 up and down 660 results in the same behavior as the letter-by-letter based row-by-row implementation. This is because moving the selection handle 630 up and down 660 snaps the corresponding end of the selection area 620 to the row closest to the selection handle 630. In this row selection mode, there may be a threshold area 640 provided, such that when a selection handle 630 is moved outside of this threshold area 640, the selection mode returns to letter-by-letter selection mode. For example, moving the selection handle 630 into the text region (or 'letter-by-letter selection mode' region) 650 may cause row-by-row mode to end. This is illustrated in FIG. 6B, which shows the resulting selection area 621 from such a movement 665 of the selection handle 630 into the text region. Continuing to move the selection handle 630 within the threshold area may result in row-by-row selection mode to be maintained, as shown in FIG. 6C, where the selection area 622 has been extended by row.

The threshold area 640 may vary in width to compensate for the aforementioned curvature of thumb movement. By causing the threshold area to increase with area 640 at regions further from the start point of the selection handle 630, it may allow for more horizontal variation in the movement of the selection handle. The width of the threshold area 640 at various points along its length may be controlled dynamically, such that it varies according to various factors. One such factor may be the number of rows already selected, since there is a higher chance that the user will continue to remain in row-by-row selection mode if a large number of rows have already been selected. Moreover, the width of the threshold area 640 may be increased so as to require a larger, more deliberate movement of the selection handle 630 into the text area 650 before letter-by-letter mode is activated instead of row-by-row selection. The threshold area 640 may increase as more rows are selected. Similarly, if the selection area 620 is reduced, the likelihood of returning to letter-by-letter mode increases, and so the threshold area 640 may decrease as a result. Another possible factor may be the speed of the movement of the selection handle 630. For example, if it is moved quickly, there is a higher chance of deviation from a straight line, and so the width of the threshold area 640 may be increased to compensate for this.

This method may be applied to column-by-column selection rather than row-by-row selection, depending on the orientation of the text. For example, in certain language systems, the text may be arranged in vertical lines rather than horizontal lines.

Figure 11:
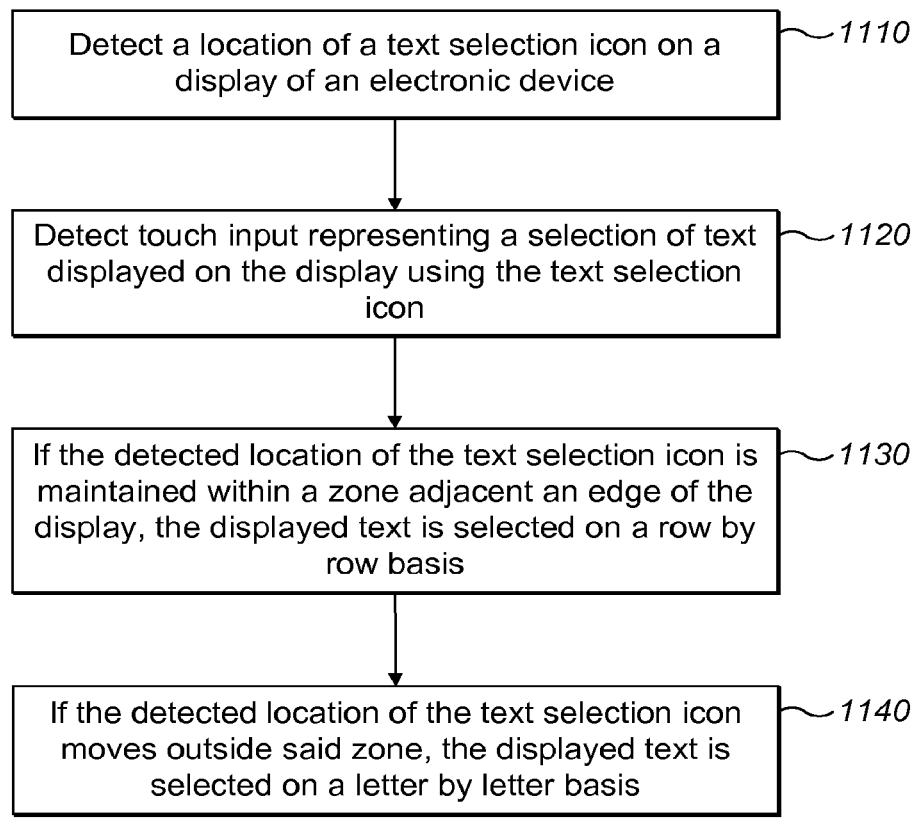
FIG. 11 is a flowchart illustrating a method of row-by-row selection in accordance with the disclosure; and, FIG. 12 is a flowchart illustrating a method of paragraph selection in accordance with the disclosure.
Figure 12:
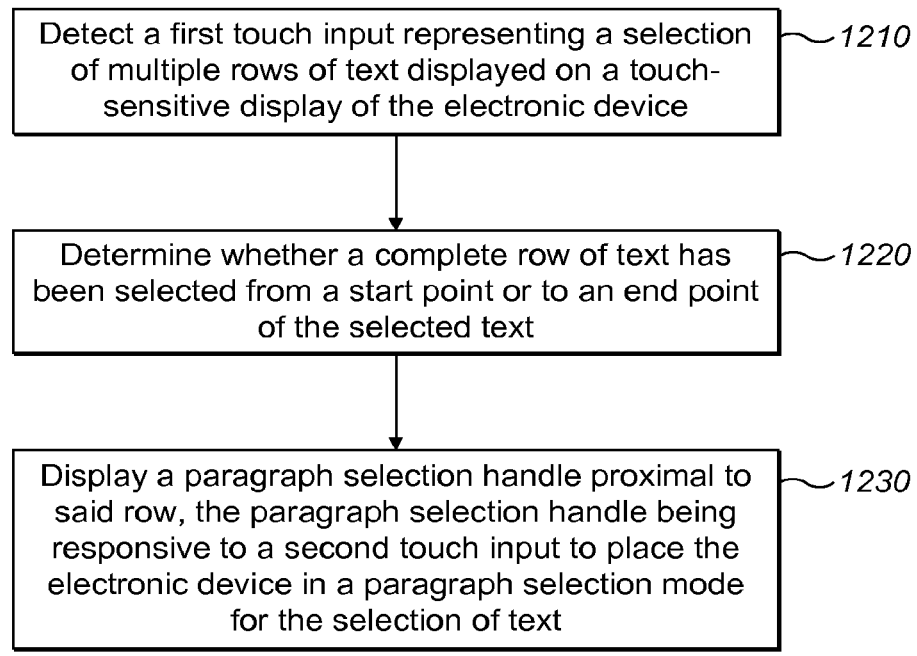

A flowchart illustrating a method of performing row-by-row selection is shown in FIG. 11. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, which may be a non-transitory or tangible storage medium.

In the method shown in FIG. 11, the location of a text selection icon on a display of an electronic device is detected 1110. Detect touch input representing a selection of text displayed on the display using the text selection icon 1130. If the detected location of the text selection icon is maintained within a zone adjacent an edge of the display, the displayed text is selected on a row-by-row basis 1130. If the detected location of the text selection icon moves outside this zone, the displayed text is selected on a letter-by-letter basis 1140.

Selection Handle

Selection handles may be used for controlling selection areas on a display. Methods are now described which improve on existing selection handle technology, and may be used in any combination with the methods previously described or may be implemented independently.

FIG. 7A shows an electronic device with a touch-sensitive screen, and displayed on that screen is a first paragraph of text 710, a second paragraph of text 711, and a picture 712. In an example, a selection 720 has already been made and a start selection handle 730 and end selection handle 740 are displayed in connection with the start and end points of the selection 720. This selection 720 may have been made by an earlier touch input.

FIG. 7B shows a user 760 touching the selection handle 730, and in doing so obscuring the selection handle 730 and also letters near to the touch area 750. A problem therefore arises, in that the user is unable to see the current location of the selection handle 730 will not be able to accurately determine what is currently selected, when adjusting the selection area 720.

One proposed solution is illustrated in FIG. 7C. On performing a touch interaction with the selection handle 730, the contents of the display may move 780 such that the text in close proximity to the touched selection handle 730 is not obscured by the touch input object 760. In this way, the user may be able to view the content just selected. Also, or instead of this movement 780, an extended selection handle 777 may appear. This extended selection handle 777 may provide a graphical link between the point of touch on the touch-sensitive display 118 and the corresponding end of a selection area 720. The touch point may not only be graphically coupled to the end of the selection area 720 by the extended selection handle 777, but may also be operatively coupled to it. Therefore, if the touch point moves (for example, because the user 760 performs a drag while still touching on the selection handle 777), the corresponding end of the selection area 720 may move as well.

Figure 8C:
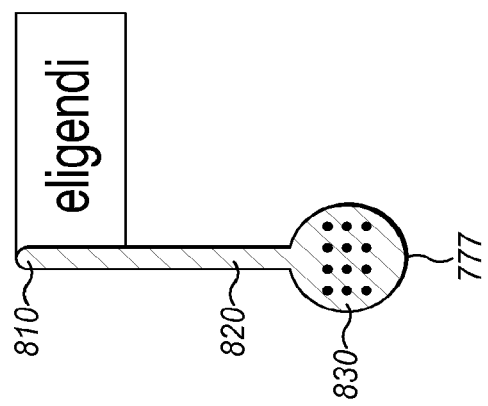
FIGS. 8A to 8C show a selection handle in accordance with the disclosure.
Figure 8B:
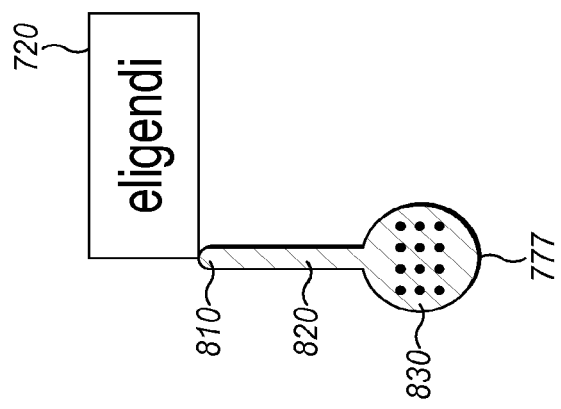
Figure 8A:
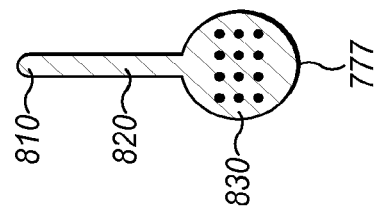

FIG. 8A shows a more detailed view of the extended selection handle 777. On this extended selection handle 777 there may be a touch portion 830 (also referred to as a 'handle'), a neck portion 820 (also referred to as a 'cursor neck') and a content selection portion 810 (also referred to as a 'content selection portion'). The touch portion 830 may be the portion of the selection handle 777 that responds to user input and can be touched and dragged to cause the rest of the selection handle 777 to be moved. If a touch input is used to drag the selection handle 777, the touch portion may remain coupled to the location on the display corresponding to the detected touch location such that it always remains under the user's finger as the selection handle 777 is moved.

The content selection portion 810 may be coupled to a selection area 720. For example, as shown in FIG. 8B, the content selection portion 810 is coupled to a start end of the selection area 720 such that as the selection handle 777 moves, as does the start of the selection area 720. This may be represented graphically in a different way, such as shown in FIG. 8C, where the content selection portion 810 is also coupled to the start end of the selection area 720, but is displayed to reach the top left portion of the selection area 720. Functionally, there may be no difference between the two selection handles 777 shown in FIGS. 8B and 8C.

The neck portion 820 graphically connects the touch portion 830 to the content selection portion 810. While the touch portion 830 may be obscured by a user's touch, the user may be able to see the neck portion 820 extending from the touch portion 830 (under the user's finger) to the content selection portion 810. This may indicate to the user that the touch portion 830 and content selection portion 810 are connected, and that by dragging the touch portion 830, the content selection portion 810 will also be moved. Referring back to FIG. 7C, although the part of the selection area 720 that the user touched has moved away, because the extended selection handle 777 has been displayed the user will see a connection between where they originally pressed and where the corresponding selection area 720 has now moved to. The extended selection handle 777 may be displayed as an animation, showing a transformation of the original selection handle 730 to the extended selection handle 777. Such an animation may be a neck portion extending out of the original selection handle 730 at the same rate as the underlying content moves up 780.

Figure 9B:
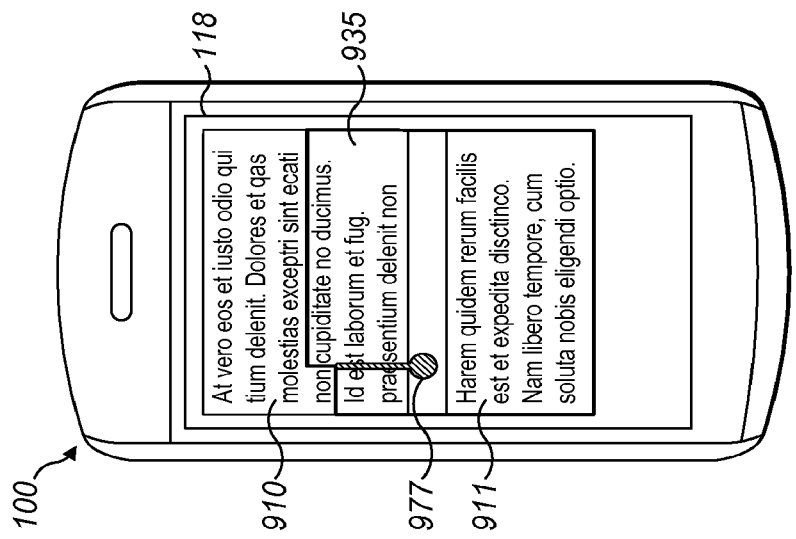
FIGS. 9A and 9B illustrate an electronic device in accordance with an embodiment showing the extension of a selection handle in response to user input.
Figure 9A:
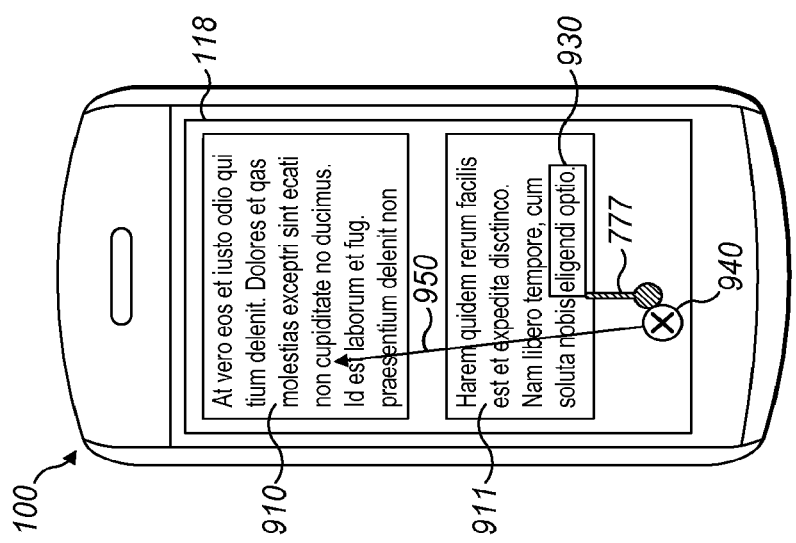

FIG. 9A shows an electronic device 100 with a touch-sensitive display 118 displaying a first and second paragraph 910 and 911, a selection area 930 and an extended selection handle 777 coupled to the start of the selection area 930. If a user touches 940 the touch portion of the extended selection handle 777 and drags 950 it to a different location, the user's finger (or other touch object) may not obscure the start area of the selection area 930, because the start of the selection area 930 is spatially separated from the touch portion of the extended selection handle 777. Therefore, the user may adjust the selection area 930 while still being able to see where the start of the selection area 930 is being moved. Similarly, the end of the selection area 930 may be moved through use of an extended selection handle coupled to the end of the selection area 930.

However, as the user performs a drag to move the extended selection handle 777, there may be a delay between the receipt of the touch input indicating a drag and the updating of the display to show the new position of the extended selection handle 777 and selection area 930. A result of such a delay may be that the user's finger (or other touch object) does obscure a part of the selection area 930 or nearby text as the drag is performed. In other words the selection area 930 may not be able to move as fast as the drag motion and may become obscured as a result. Also, as a user's finger changes position on the touch-sensitive display 118, the angle the finger makes to the display may change and there may be a difference between location where the touch is registered and the location the user thinks they are touching.

FIG. 9B provides a possible solution to this problem. As the extended selection handle is moved, the neck portion may extend 977 to increase the distance between the touch portion and the content selection portion. In other words, to prevent the physical location of the touch object 'catching up' with the coupled part of the selection area 935, the neck portion extends faster than the finger moves. This extension may also cater for a changed angle of the user's finger. The length of the neck portion may change dynamically depending on factors including the speed of the drag, position of the selection area with respect to the edges of the screen, the detected angle of the user's finger and the size of the font of the content being selected. The neck portion may have a maximum length and it may have a minimum length.

A flowchart illustrating a method of modifying a selection handle is shown in FIG. 10. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, which may be a non-transitory or tangible storage medium.

In the method shown in FIG. 10, a content selection icon is displayed on a touch-sensitive display of an electronic device 1010. A touch input is detected at a location operable to select a content selection function associated with the content selection icon 1020. On detecting the touch, the content selection icon is modified to display a touch portion at a location on the display corresponding to the detected touch location, and a content selection portion operatively coupled to, but spatially separated from the touch portion 1030.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

The invention claimed is:

1. A method for an electronic device, the method comprising:
   detecting a location of a text selection icon on a touchscreen display of the electronic device;
   detecting touch input reflecting a selection of text displayed on the display using the text selection icon, wherein the touch input comprises a continuous movement of the text selection icon;
   wherein the detected location of the text selection icon is outside an area adjacent an edge of the display, enabling a row selection mode responsive to a determination that the continuous movement causes the text selection icon to move from the location outside the area adjacent the edge of the display to a location within the area adjacent the edge of the display, wherein in the row selection mode, the selection of text comprises a selection of an entire row of the text nearest to the text selection icon; or
   wherein the detected location of the text selection icon is within the area adjacent the edge of the display, enabling a letter selection mode responsive to a determination that the continuous movement causes the text selection icon to move from the location within the area adjacent the edge of the display to a location outside the area adjacent the edge of the display, wherein in the letter selection mode, the selection text comprises a selection of a letter of the text nearest to the text selection icon; and
   wherein a width of the area adjacent the edge of the display varies based on speed of the continuous movement of the text selection icon.

2. The method of claim 1, further comprising maintaining the row selection mode responsive to a determination that the continuous movement causes the text selection icon to move from the location within the area adjacent the edge of the display to another location within the area adjacent the edge of the display.

3. The method of claim 1, further comprising maintaining the letter selection mode responsive to a determination that the continuous movement causes the text selection icon to move from the location outside the area adjacent the edge of the display to another location outside the area adjacent the edge of the display.

4. The method of claim 1, wherein the width of the area adjacent the edge of the display increases when the speed of the continuous movement of the text selection icon is beyond a threshold.

5. An electronic device comprising:
a touch-screen display configured to receive touch input;
at least one processor configured to:
  detect a location of a text selection icon on the display,
  detect a touch input reflecting a selection of text displayed on the display using the text selection icon, wherein the touch input comprises a continuous movement of the text selection icon;
  wherein the detected location of the text selection icon is outside an area adjacent an edge of the display, enable a row selection mode responsive to a determination that the continuous movement causes the text selection icon to move from the location outside the area adjacent the edge of the display to a location within the area adjacent the edge of the display, wherein in the row selection mode, the selection of text comprises a selection of an entire row of the text nearest to the text selection icon; or
wherein the detected location of the text selection icon is within the area adjacent the edge of the display, enabling a letter selection mode responsive to a determination that the continuous movement causes the text selection icon to move from the location within the area adjacent the edge of the display to a location outside the area adjacent the edge of the display, wherein in the letter selection mode, the selection text comprises a selection of a letter of the text nearest to the text selection icon; and
wherein a width of the area adjacent the edge of the display varies based on speed of the continuous movement of the text selection icon.

6. The electronic device of claim 5, the at least one processor further configured to maintain the row selection mode responsive to a determination that the continuous movement causes the text selection icon to move from the location within the area adjacent the edge of the display to another location within the area adjacent the edge of the display.

7. The electronic device of claim 5, the at least one processor further configured to maintain the letter selection mode responsive to a determination that the continuous movement causes the text selection icon to move from the location outside the area adjacent the edge of the display to another location outside the area adjacent the edge of the display.

8. The electronic device of claim 5, wherein the width of the area adjacent the edge of the display increases when the speed of the continuous movement of the text selection icon is beyond a threshold.

9. A method for an electronic device, the method comprising:
detecting a location of a text selection icon on a touch-screen display of the electronic device;
detecting touch input reflecting a selection of text displayed on the display using the text selection icon, wherein the touch input comprises a continuous movement of the text selection icon;
wherein the detected location of the text selection icon is outside an area adjacent an edge of the display, enabling a row selection mode responsive to a determination that the continuous movement causes the text selection icon to move from the location outside the area adjacent the edge of the display to a location within the area adjacent the edge of the display; or
wherein the detected location of the text selection icon is within the area adjacent the edge of the display, enabling a letter selection mode responsive to a determination that the continuous movement causes the text selection icon to move from the location within the area adjacent the edge of the display to a location outside the area adjacent the edge of the display, wherein in the letter selection mode, the selection text comprises a selection of a letter of the text nearest to the text selection icon; and
wherein a width of the area adjacent the edge of the display is determined based on prior selections being in the row selection mode or the letter selection mode.

10. The method of claim 9, further comprising maintaining the row selection mode responsive to a determination that the continuous movement causes the text selection icon to move from the location within the area adjacent the edge of the display to another location within the area adjacent the edge of the display.

11. The method of claim 9, further comprising maintaining the letter selection mode responsive to a determination that the continuous movement causes the text selection icon to move from the location outside the area adjacent the edge of the display to another location outside the area adjacent the edge of the display.

12. The method of claim 9, wherein the prior selections being in the row selection mode or the letter selection mode comprise a number of rows already selected being in the row selection mode or the letter selection mode.

13. The method of claim 9, wherein the width of the area adjacent the edge of the display increases when more rows are selected in the row selection mode or the letter selection mode as the text selection icon moves.

14. An electronic device comprising:
a touch-screen display configured to receive touch input;
at least one processor configured to:
  detect a location of a text selection icon on the display,
  detect a touch input reflecting a selection of text displayed on the display using the text selection icon, wherein the touch input comprises a continuous movement of the text selection icon;
  wherein the detected location of the text selection icon is outside an area adjacent an edge of the display, enable a row selection mode responsive to a determination that the continuous movement causes the text selection icon to move from the location outside the area adjacent the edge of the display to a location within the area adjacent the edge of the display, wherein in the row selection mode, the selection of text comprises a selection of an entire row of the text nearest to the text selection icon; or
wherein the detected location of the text selection icon is within the area adjacent the edge of the display, enabling a letter selection mode responsive to a determination that the continuous movement causes the text selection icon to move from the location within the area adjacent the edge of the display to a location outside the area adjacent the edge of the display, wherein in the letter selection mode, the selection text comprises a selection of a letter of the text nearest to the text selection icon; and wherein a width of the area is determined based on prior selections being in the row selection mode or the letter selection mode.

15. The electronic device of claim 14, the at least one processor further configured to maintain the row selection mode responsive to a determination that the continuous movement causes the text selection icon to move from the location within the area adjacent the edge of the display to another location within the area adjacent the edge of the display.

16. The electronic device of claim 14, the at least one processor further configured to maintain the letter selection mode responsive to a determination that the continuous movement causes the text selection icon to move from the location outside the area adjacent the edge of the display to another location outside the area adjacent the edge of the display.

17. The electronic device of claim 14, wherein the prior selections being in the row selection mode or the letter selection mode comprise a number of rows already selected being in the row selection mode or the letter selection mode.

18. The electronic device of claim 14, wherein the width of the area adjacent the edge of the display increases when more rows are selected in the row selection mode or the letter selection mode as the text selection icon moves.

* * * * *